(12) United States Patent
Chai et al.

(10) Patent No.: US 11,720,222 B2
(45) Date of Patent: Aug. 8, 2023

(54) 3D INTERACTION INPUT FOR TEXT IN AUGMENTED REALITY

(71) Applicant: INTERNATIONAL BUSINESS MACHINES CORPORATION, Armonk, NY (US)

(72) Inventors: Wei Na Chai, Shanghai (CN); Ye Chang Hu, Shanghai (CN); Ying Shao, Shanghai (CN); Li Yi Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 15/816,448

(22) Filed: Nov. 17, 2017

(65) Prior Publication Data
US 2019/0155482 A1 May 23, 2019

(51) Int. Cl.
G06F 3/048 (2013.01)
G06F 3/04815 (2022.01)
(Continued)

(52) U.S. Cl.
CPC ........ *G06F 3/04815* (2013.01); *G06F 3/0482* (2013.01); *G06F 3/04886* (2013.01);
(Continued)

(58) Field of Classification Search
None
See application file for complete search history.

(56) References Cited

U.S. PATENT DOCUMENTS 7,186,041 B2   3/2007   Harley
8,289,283 B2  10/2012   Kida et al.
(Continued)

FOREIGN PATENT DOCUMENTS

CN    102221898 A   10/2011
CN    105224069 A    1/2016
WO   2012155776 A1  11/2012

OTHER PUBLICATIONS

Mell et al., "The NIST Definition of Cloud Computing," U.S. Department of Commerce, National Institute of Standards and Technology, Sep. 2011, p. 1-7, Special Publication 800-145.
(Continued)

*Primary Examiner* — Hua Lu
(74) *Attorney, Agent, or Firm* — Michael O'Keefe

(57) ABSTRACT

A method, computer system, and computer program product for implementing three-dimensional text input in an augmented reality system are provided. The embodiment may include capturing a first user hand position along a first axis of a three-dimensional virtual space. The embodiment may also include identifying a first character along the first axis corresponding to the first user hand position. The embodiment may further include capturing a second user hand position along a second axis of the three-dimensional virtual space. The embodiment may also include identifying a second character along the second axis corresponding to the second user hand position. The embodiment may further include identifying one or more proposed words beginning, consecutively, with the identified first character and the identified second character using a dictionary database. The embodiment may also include displaying the one or more identified proposed words on a third axis of the three-dimensional virtual space.

17 Claims, 5 Drawing Sheets

(51) Int. Cl.
  *G06F 3/04886* (2022.01)
  *G06F 3/0482* (2013.01)
  *G06F 40/242* (2020.01)
  *G06F 40/263* (2020.01)
  *G06F 40/274* (2020.01)

(52) U.S. Cl.
  CPC .......... *G06F 40/242* (2020.01); *G06F 40/263* (2020.01); *G06F 40/274* (2020.01)

(56) References Cited

U.S. PATENT DOCUMENTS

| | | | |
|---|---|---|---|
| 8,788,977 B2 | 7/2014 | Bezos | |
| 10,067,669 B1* | 9/2018 | Mahmoud | G06V 30/32 |
| 2002/0174271 A1* | 11/2002 | Tanigawa | G06F 16/58 |
| | | | 707/E17.026 |
| 2004/0003142 A1* | 1/2004 | Yokota | G06Q 10/02 |
| | | | 710/1 |
| 2005/0249046 A1* | 11/2005 | Gueissaz | G04C 3/004 |
| | | | 368/160 |
| 2005/0273724 A1* | 12/2005 | Joeressen | G06F 3/0236 |
| | | | 715/773 |
| 2007/0010913 A1* | 1/2007 | Miyamoto | B25J 9/1658 |
| | | | 700/264 |
| 2008/0129552 A1* | 6/2008 | Wigdor | G06F 3/0233 |
| | | | 341/22 |
| 2008/0300055 A1* | 12/2008 | Lutnick | G06V 40/107 |
| | | | 463/39 |
| 2009/0231275 A1* | 9/2009 | Odgers | G06F 3/04886 |
| | | | 345/157 |
| 2011/0254765 A1* | 10/2011 | Brand | G06F 3/017 |
| | | | 345/158 |
| 2012/0165096 A1 | 6/2012 | Geisner et al. | |
| 2012/0319940 A1 | 12/2012 | Bress et al. | |
| 2013/0117377 A1 | 5/2013 | Miller | |
| 2013/0194173 A1* | 8/2013 | Zhu | G06F 3/017 |
| | | | 345/156 |
| 2013/0342441 A1* | 12/2013 | Murase | G06F 3/0346 |
| | | | 345/156 |
| 2014/0006997 A1* | 1/2014 | Kim | G06F 3/0304 |
| | | | 715/773 |
| 2014/0055343 A1* | 2/2014 | Kim | G06F 3/0304 |
| | | | 345/156 |
| 2014/0292749 A1* | 10/2014 | Vaganov | H04N 13/30 |
| | | | 345/419 |
| 2014/0380223 A1 | 12/2014 | Counsell et al. | |
| 2015/0051901 A1* | 2/2015 | Stonehouse | G06F 3/04886 |
| | | | 704/9 |
| 2015/0130721 A1* | 5/2015 | Hirsch | G06F 3/04886 |
| | | | 345/168 |
| 2015/0205358 A1* | 7/2015 | Lyren | G06F 3/04883 |
| | | | 715/765 |
| 2015/0212688 A1* | 7/2015 | Mcmillan | G06F 3/04883 |
| | | | 715/850 |
| 2015/0277751 A1* | 10/2015 | Manmualiya | G06F 3/04886 |
| | | | 715/773 |
| 2016/0012745 A1* | 1/2016 | Olsen | G09B 13/04 |
| | | | 434/227 |
| 2016/0085379 A1 | 3/2016 | Cho et al. | |
| 2016/0132233 A1* | 5/2016 | Ghassabian | G06F 3/04886 |
| | | | 715/773 |
| 2016/0147307 A1* | 5/2016 | Masuko | G06F 40/129 |
| | | | 715/863 |
| 2016/0171297 A1* | 6/2016 | Qin | G06V 30/1423 |
| | | | 382/187 |
| 2016/0179210 A1* | 6/2016 | Sakai | G06F 3/018 |
| | | | 345/156 |
| 2016/0188988 A1* | 6/2016 | Zheng | G06V 30/228 |
| | | | 382/186 |
| 2016/0378195 A1* | 12/2016 | Lefebvre | G06V 30/2276 |
| | | | 382/156 |
| 2017/0003876 A1* | 1/2017 | Marsden | G06F 3/0231 |
| 2017/0052701 A1 | 2/2017 | Rosenfeld et al. | |
| 2017/0285761 A1* | 10/2017 | Yagi | G06F 3/0482 |
| 2018/0081539 A1* | 3/2018 | Ghassabian | G06F 3/0236 |
| 2018/0210643 A1* | 7/2018 | Ghassabian | G06F 3/04883 |
| 2018/0260111 A1* | 9/2018 | Wu | G06F 3/04886 |
| 2019/0007537 A1* | 1/2019 | Li | G06F 3/03545 |
| 2019/0121446 A1* | 4/2019 | Elazari | G06F 40/274 |
| 2019/0130733 A1* | 5/2019 | Hodge | G08B 25/00 |

OTHER PUBLICATIONS

Jung et al., "Augmented Keyboard—A Virtual Keyboard Interface For Smart Glasses", Proceedings of the 13th ACM SIGGRAPH International Conference on Virtual-Reality Continuum and its Applications in Industry (VRCAI '14), pp. 159-164, Shenzhen, China—Nov. 30-Dec. 2, 2014, ACM New York, NY, USA, copyright 2014.

* cited by examiner

3D INTERACTION INPUT FOR TEXT IN AUGMENTED REALITY

BACKGROUND

The present invention relates, generally, to the field of computing, and more particularly to augmented reality.

Augmented reality relates to technology that modifies a direct or indirect user view of a real-world environment with computer-generated elements using various inputs, such as sound data, image data, or location data. Various technologies may be implemented when utilizing augmented reality, such as eyeglasses, head-mounted displays, head-up displays, contact lenses, virtual reality displays, and handheld displays. Augmented reality may have numerous applications within society including uses in literature, architecture, visual art, education, emergency management, video gaming, medicine, military, navigation, tourism, language translation, and music production.

SUMMARY

According to one embodiment, a method, computer system, and computer program product for implementing three-dimensional text input in an augmented reality system are provided. The embodiment may include capturing a first user hand position along a first axis of a three-dimensional virtual space. The embodiment may also include identifying a first character along the first axis corresponding to the first user hand position. The embodiment may further include capturing a second user hand position along a second axis of the three-dimensional virtual space. The embodiment may also include identifying a second character along the second axis corresponding to the second user hand position. The embodiment may further include identifying one or more proposed words beginning, consecutively, with the identified first character and the identified second character using a dictionary database. The embodiment may also include displaying the one or more identified proposed words on a third axis of the three-dimensional virtual space.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
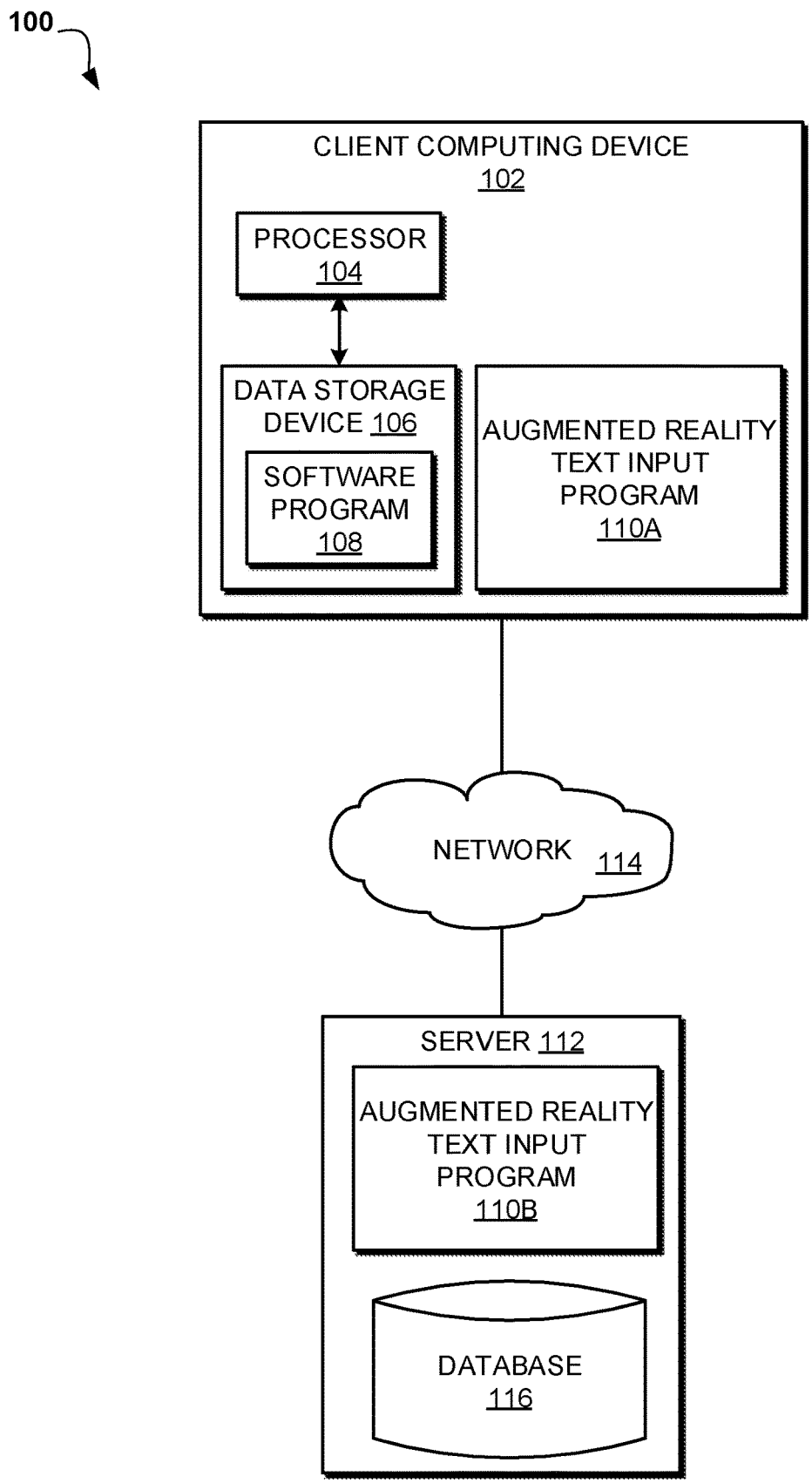
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to augmented reality. The following described exemplary embodiments provide a system, method, and program product to, among other things, implement a three-dimensional space for the input of text using an augmented reality system. Therefore, the present embodiment has the capacity to improve the technical field of augmented reality by improving character and word selection accuracy when a user is interacting in a three-dimensional, augmented reality space.

As previously described, augmented reality relates to technology that modifies a direct or indirect user view of a real-world environment with computer-generated elements using various inputs, such as sound data, image data, or location data. Various technologies may be implemented when utilizing augmented reality, such as eyeglasses, head-mounted displays, head-up displays, contact lenses, virtual reality displays, and handheld displays. Augmented reality may have numerous applications within society including uses in literature, architecture, visual art, education, emergency management, video gaming, medicine, military, navigation, tourism, language translation, and music production.

Augmented reality and virtual reality (AR/VR) systems are becoming ever present in the current technological landscape. These technologies allow for new and more dynamic interactions between humans and computers. Utilizing an interaction space, AR/VR systems are able to identify user locations via sensors placed around the user's body. For example, the user may wear gloves with embedded sensors to allow an AR/VR system to identify the location of the user's hands in a virtual space. However, many AR/VR systems have difficulty in identifying the exact location within the three-dimensional space since many computers may have difficulty in recognizing three-dimensional movement of a user's hands and fingers versus identifying user movements in a two-dimensional space. This difficulty is ever present for the process of text input where the common method of using AR/VR devices is more likely to result in mishandling failures since may characters exist on a virtual QWERTY keyboard and each character on the keyboard occupies a small amount of space. As such, it may be advantageous to, among other things, implement a system that recognizes user movements in a three-dimensional augmented reality space as various movements in one or two dimensions and predicting subsequent user movements based on the current and previous user selected characters or words.

According to one embodiment, a three-dimensional virtual keyboard may be utilized to capture user movements when selecting characters. Since augmented reality systems may be more accurate when capturing movements in a one or two dimensional space, user movements along one axis of the three-dimensional virtual space may be initially monitored to capture the first character of a word. For example, the user may select the first character from a list of character displayed along the x-axis of a virtual space. The second character of a word may be captured by following subsequent user movements in the three-dimensional virtual space along a perpendicular axis. For example, the second character may be selected by the user from a list of characters along the z-axis of a virtual space. Using a dictionary database, common words beginning with the first and second characters may be displayed to the user along the third axis perpendicular to the x-z plane (e.g., y-axis). The user may then be capable of selecting the desired word from the displayed proposed words.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize a virtual keyword to capture user movements in one or two dimensions at a time when determining user input text. Furthermore, proposed words may be displayed to and selected by the user on the virtual axis perpendicular to the plane created by the axes used to select the characters of the user-desired words.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an augmented reality text input program 110A and communicate with the server 112 via the communication network 114, in accordance with one embodiment of the invention. Client computing device 102 may be, for example, an augmented reality device, a virtual reality device, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an augmented reality text input program 110B and a database 116, such as a dictionary database, and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the augmented reality text input program 110A, 110B may be a program capable of capturing user movements while interacting with a three-dimensional keyboard spread across an axis. Upon receiving user designations of characters, the augmented reality text input program 110A, 110B may display proposed words across another axis displayed within the three-dimensional virtual space to allow the user to select the desired word. The augmented reality text input program 110A, 110B may be utilized in various languages, including Chinese, English, Spanish, and German. The augmented reality text input method is explained in further detail below with respect to FIG. 2.

Figure 2:
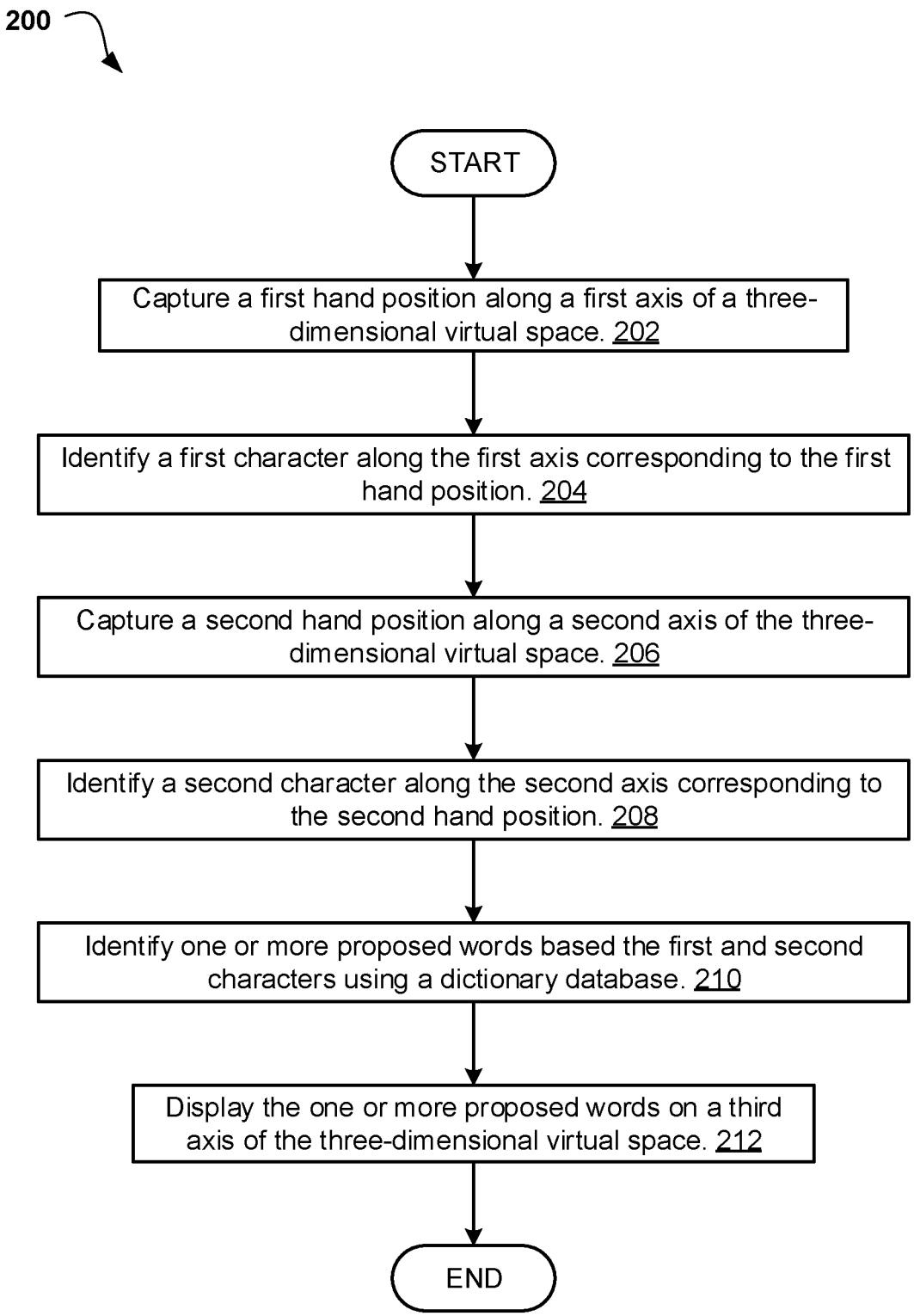
FIG. 2 is an operational flowchart illustrating an augmented reality text input process according to at least one embodiment.

FIG. 2 is an operational flowchart illustrating an augmented reality text input process 200 according to at least one embodiment. At 202, the augmented reality text input program 110A, 110B captures a first user hand position along a first axis of a three-dimensional virtual space. The augmented reality text input program 110A, 110B may display a three-dimension keyboard to a user utilizing an augmented reality or virtual reality headset. The three dimension keyboard may be a multi-axis graph with alphanumeric characters along each axis. For example, the three dimension keyboard may have an x-axis, a y-axis, and a z-axis where the x-axis and z-axis have evenly spaced markers with alphanumeric characters, such as the letter "A" through the letter "Z", displayed. In at least one embodiment, the three-dimensional keyboard may have three axes but is not specifically limited to only three axes in other embodiments as any number of axes may be utilized.

As a user navigates the three-dimensional keyboard, the augmented reality text input program 110A, 110B may capture position data from sensors corresponding to the augmented reality or virtual reality system that translate to the user's hand or arm positions. The position data may represent the user engaging with the three-dimensional keyboard to select a character represented along an axis of the keyboard that begins a word the user wishes to input to the client computing device 102. For example, if the user wishes to input the word "BANANA" using the three-dimensional keyboard. The user may interact with the virtual space of an augmented reality system to move along the x-axis until the user's hand position is aligned with the letter "B". The augmented reality text input program 110A, 110B may capture the coordinates within the virtual space that correspond to the user's hand position with the letter "B". In at least one embodiment, the augmented reality text input program 110A, 110B may determine that the user has reached the desired location on the three-dimensional virtual space by either detecting the user's hand has stayed over the position for a preconfigured period of time, the user has performed a preconfigured hand movement (e.g., finger pinch), or the user has interacted with the augmented reality or virtual reality system in some manner (e.g., button press).

Then, at 204, the augmented reality text input program 110A, 110B identifies a first character along the first axis corresponding to the first user hand position. Once the augmented reality text input program 110A, 110B captures the user hand position data within the virtual space of an augmented reality or a virtual reality system, the augmented reality text input program 110A, 110B may then relate the captured hand position data to a specific character corresponding to the user hand position on an axis of the three-dimensional keyboard used to select the first letter of a word the user wishes to input. For example, in the previous example where the user wishes to spell the word "BANANA" and the x-axis is designated as the axis on which the user navigates along to select a first letter of a word, the user hand position data may be analyzed to determine that the user hand position corresponds to the position of the letter "B" on the x-axis. Therefore, the augmented reality text input program 110A, 110B may identify the letter "B" as the first character of the word the user wishes to input.

Next, at 206, the augmented reality text input program 110A, 110B captures a second hand position along a second axis of the three-dimensional virtual space. Once the augmented reality text input program 110A, 110B identifies the first character, the augmented reality text input program 110A, 110B may allow the user to navigate along a second axis on the three-dimensional keyboard to a second location that corresponds to a character on the second axis corresponding to the second letter of the word the user wishes to input. For example, in the previous example where the user is spelling the word "BANANA", the user may change hand position from the letter "B" represented along the x-axis to the letter "A" represented along the z-axis. Once the augmented reality text input program 110A, 110B determines the user hand position has reached the desired second location (e.g., the user hand movement has ceased), the augmented reality text input program 110A, 110B may capture the coordinates of the user hand position within the three-dimensional virtual space of the augmented reality or virtual reality system.

Then, at 208, the augmented reality text input program 110A, 110B identifies a second character along the second axis corresponding to the second hand position. Substantially similar to step 204, once the augmented reality text input program 110A, 110B captures the user hand position data within the virtual space of an augmented reality or a virtual reality system, the augmented reality text input program 110A, 110B may then relate the captured hand position data to a specific character corresponding to the user hand position on an axis of the three-dimensional keyboard used to select the first letter of a word the user wishes to input. For example, in the previous example where the user wishes to spell the word "BANANA" and the z-axis is designated as the axis on which the user navigates along to select a second letter of a word, the user hand position data may be analyzed to determine that the user hand position corresponds to the position of the letter "A" on the z-axis. Therefore, the augmented reality text input program 110A, 110B may identify the letter "B" as the first character and the letter "A" as the second character of the word the user wishes to input.

Next, at 210, the augmented reality text input program 110A, 110B identifies one or more proposed words based on the first and second characters using a dictionary database. The augmented reality text input program 110A, 110B may have access to or include a dictionary database, such as database 116, that includes words within a user designated language. For example, if the user designated the English language as the user's preferred language, the dictionary database may include all known words within the English language. Once the first two characters of the user-desired word are identified in steps 204 and 208, the augmented reality text input program 110A, 110B may query the dictionary database to identify words within the user designated language that begin with the characters. For example, in the previous example where the user is spelling the word "BANANA" and has input the letter "B" as the first character and the letter "A" as the second character, the augmented reality text input program 110A, 110B may query the dictionary database to identify words within the English language that begin with the letter sequence "BA". Once the dictionary database has returned results to the query, the augmented reality text input program 110A, 110B may sort the returned results in order of commonality within the preconfigured language. For example, if the dictionary database returned the results of "BATCH", "BACKPEDAL", and "BANANA", the augmented reality text input program 110A, 110B may rank the words in the order of "BANANA", "BATCH", and "BACKPEDAL" since the word "BANANA" is more commonly used in the English language than the word "BATCH" and the word "BATCH" is more commonly used than the word "BACKPEDAL".

Then, at 212, the augmented reality text input program 110A, 110B displays the one or more proposed words on a third axis of the three-dimensional virtual space. Once the augmented reality text input program 110A, 110B has identified the proposed words from the dictionary database, the augmented reality text input program 110A, 110B may display the words along the y-axis to allow the user to select the desired word. For example, the words "BANANA", "BATCH", and "BACKPEDAL" may be displayed along the y-axis in the same manner the characters may be displayed along the x-axis and the z-axis.

In at least one embodiment, the augmented reality text input program 110A, 110B may allow the user to select the desired word depicted on the y-axis in a substantially similar manner to how the user selected the characters in steps 202 and 206. Once selected by the user, the augmented reality text input program 110A, 110B may transmit the selected word to an active application as a text file.

It may be appreciated that FIG. 2 provides only an illustration of one implementation and does not imply any limitations with regard to how different embodiments may be implemented. Many modifications to the depicted environments may be made based on design and implementation requirements. For example, although the described embodiment includes a three axis keyboard, the augmented reality text input program 110A, 110B may have many axes with which the user interacts to identify words. Therefore, the user may interact with the keyboard to fully spell a word regardless of how long the word. For example, when spelling the word "BANANA", the augmented reality text input program 110A, 110B may depict seven axes where the user can select the appropriate letter on each axis to correctly spell the word "BANANA". In at least one embodiment, the augmented reality text input program 110A, 110B may originally depict a two dimensional keyboard in a three-dimensional virtual space that includes an x-axis where the user may select the first letter of the desired word and the y-axis may display proposed words based on the most common words that include the user selected letters. As the user selects a letter on the keyboard, the augmented reality text input program 110A, 110B may display a replica of the alphanumeric sequence along another axis to allow the user to keep spelling the desired word should the desired word not be displayed along the y-axis. For example, if the first two letters selected by the user are the letters "B" and "A" but the desired word "BANANA" is not depicted along the y-axis, the user may wish to keep spelling the word. Therefore, the augmented reality text input program 110A, 110B may generate a w-axis (i.e., a fourth axis) on which the user may select the letter "N". The selection process may iterate until the user-desired word is depicted along the y-axis or the user has successfully spelled the desired word.

Additionally, the augmented reality text input program 110A, 110B may alternate axes in a three-dimensional keyboard when a user is selecting characters to spell a word rather than generating and displaying additional axes. For example, if the first two letters selected by the user are the letters "B" and "A" but the desired word "BANANA" is not depicted along the y-axis, rather than generating a w-axis, the augmented reality text input program 110A, 110B may allow the user to select a third letter of the word (e.g., the letter "N" for the instant scenario) along the x-axis on which the user originally selected the first letter. Therefore, the augmented reality text input program 110A, 110B may alternate between the x-axis and the z-axis when allowing the user to select subsequent characters of the desired word.

Figure 3:
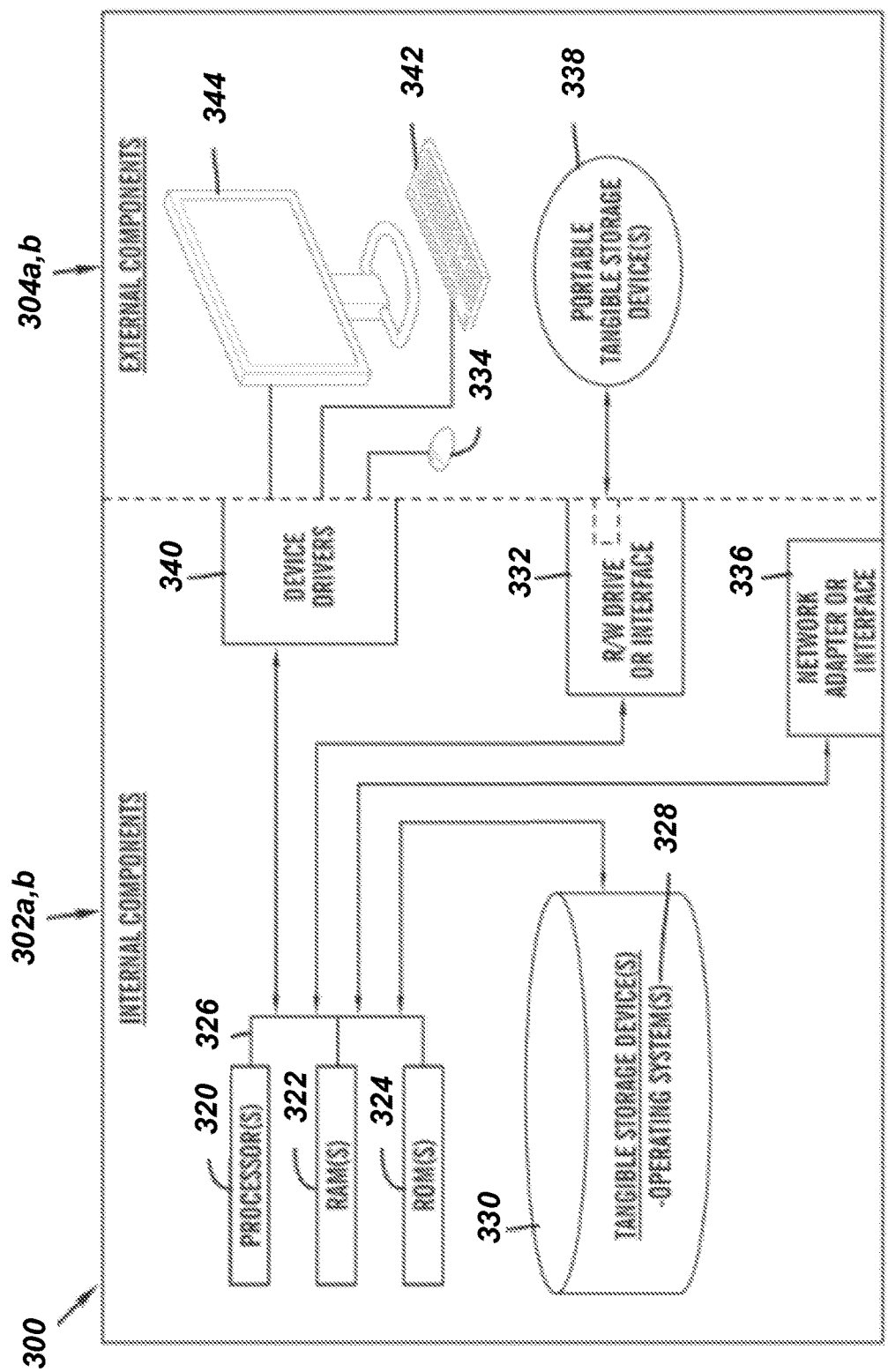
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may be represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the augmented reality text input program 110A in the client computing device 102 and the augmented reality text input program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the augmented reality text input program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the augmented reality text input program 110A in the client computing device 102 and the augmented reality text input program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the augmented reality text input program 110A in the client computing device 102 and the augmented reality text input program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
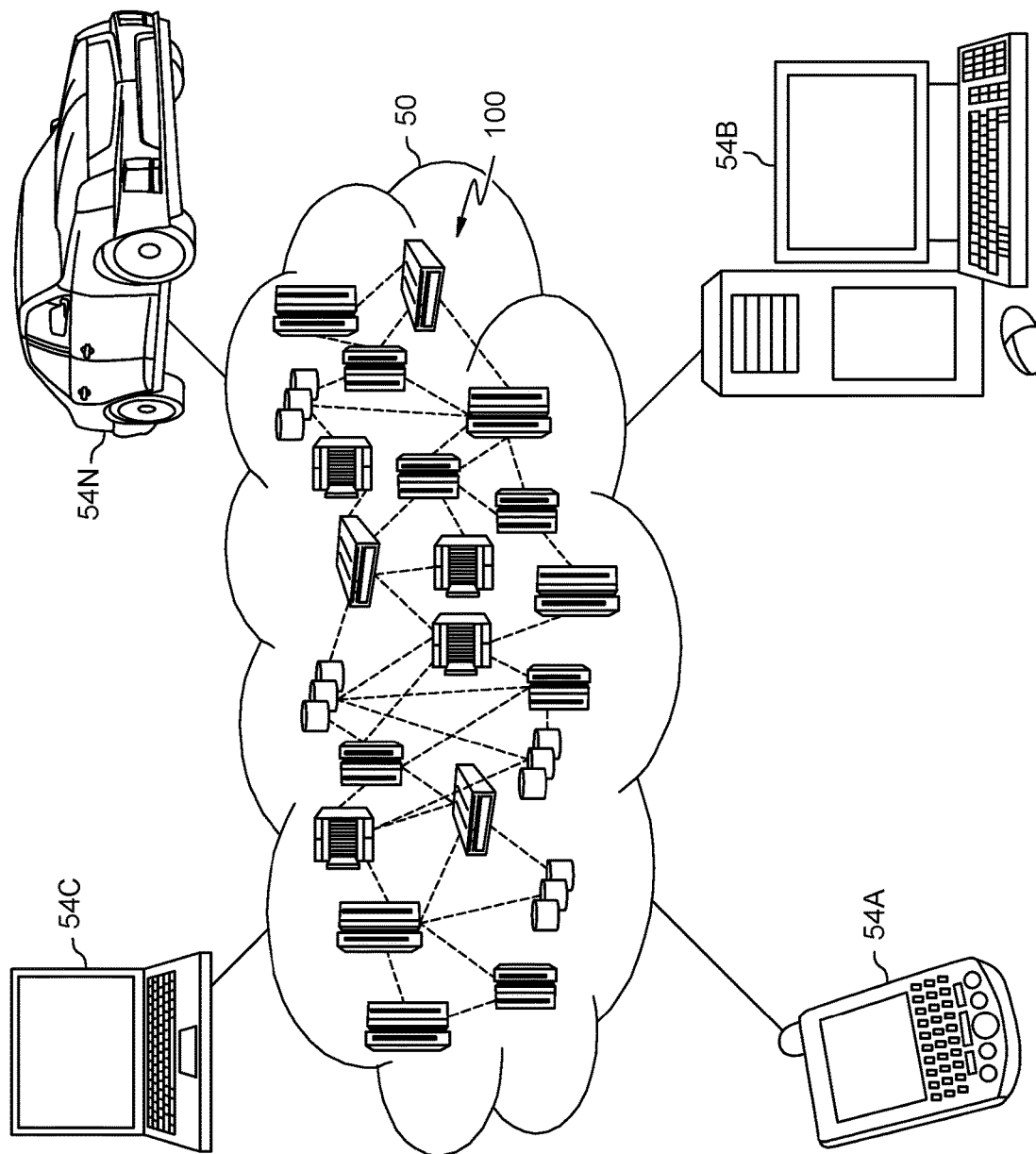
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
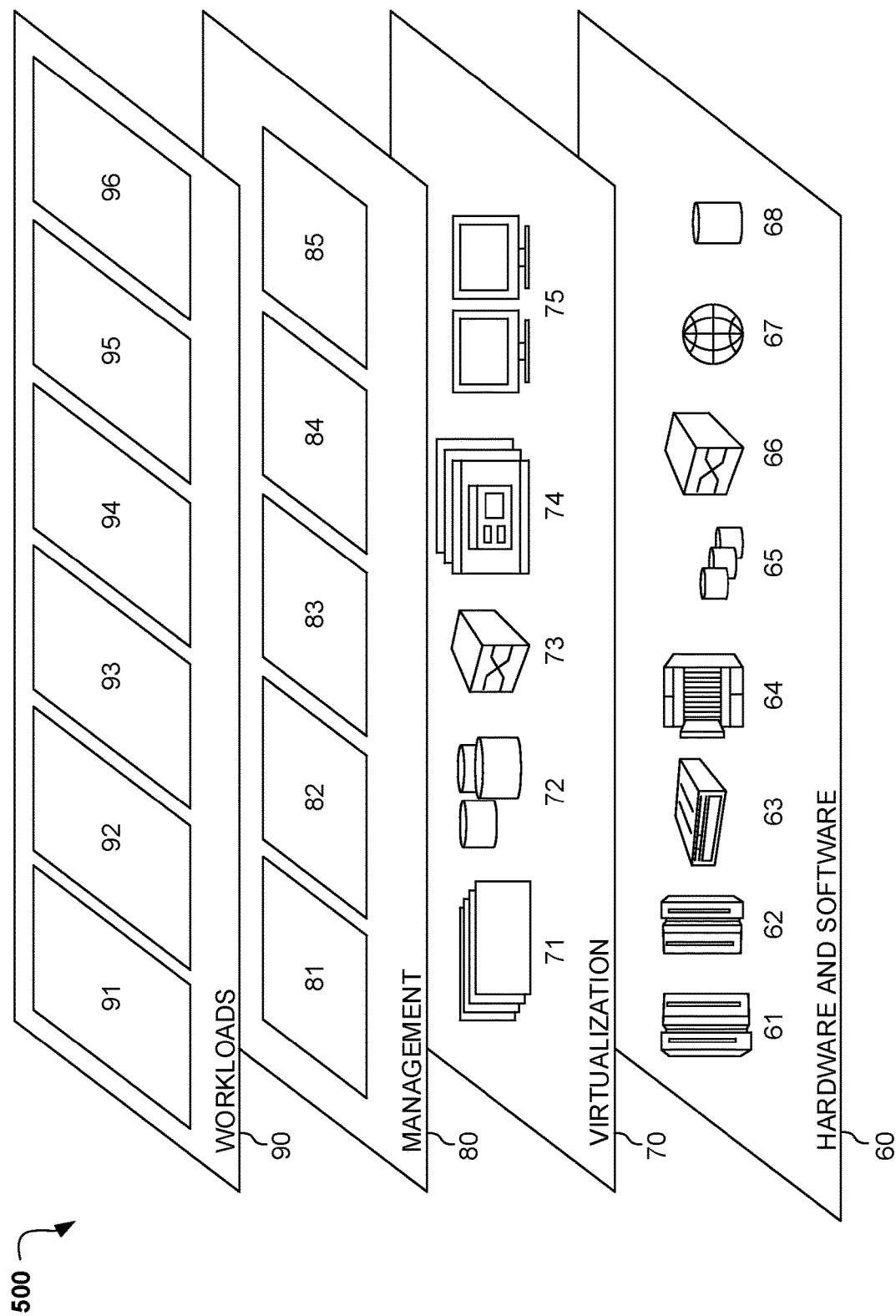
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmented reality text input 96. Augmented reality text input 96 may relate capturing user movements across axes of a virtual space to proposed words to a user for selection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for implementing three-dimensional text input in an augmented reality system, the method comprising:
   displaying, by a processor, a three-dimensional virtual space with a displayed first axis, a displayed second axis, and a displayed third axis on a display screen of the augmented reality system, wherein each character of a language is displayed and evenly distributed along each of the displayed first axis and the displayed second axis;
   capturing a first user hand position along the first axis of the three-dimensional virtual space;
   identifying a first character along the first axis corresponding to the first user hand position;
   capturing a second user hand position along the second axis of the three-dimensional virtual space;
   identifying a second character along the second axis corresponding to the second user hand position;
   identifying one or more proposed words beginning, consecutively, with the identified first character and the identified second character using a dictionary database; and
   displaying the one or more identified proposed words on the third axis of the three-dimensional virtual space.

2. The method of claim 1, further comprising:
   capturing a third user hand position along a fourth axis of the three-dimensional virtual space;
   identifying a third character along the fourth axis corresponding to the third user hand position; and
   wherein identifying the one or more proposed words comprises using the identified first character, the identified second character, and the identified third character, consecutively, utilizing the dictionary database.

3. The method of claim 1, wherein further comprising:
   receiving a user selection of a word within the one or more identified proposed words displayed on the third axis; and
   transmitting the word associated with the received user selection an application as a text file.

4. The method of claim 1, wherein the three-dimensional virtual space initially comprises a graph of two axes on which the user interacts to capture each user hand position, and wherein a new axis is added to the added to the graph after each user hand position is captured.

5. The method of claim 1, further comprising:
   capturing a third user hand position along the first axis of the three-dimensional virtual space;
   identifying a third character along the first axis corresponding to the third user hand position;
   capturing a fourth user hand position along the second axis of the three-dimensional virtual space;
   identifying a fourth character along the second axis corresponding to the fourth user hand position; and
   wherein identifying the one or more proposed words comprises using the identified first character, the identified second character, the identified third character, and the fourth identified character, consecutively, utilizing the dictionary database.

6. The method of claim 1, further comprising:
   sorting the one or more identified proposed words based on a commonality of each identified proposed word in a corresponding language.

7. A computer system for implementing three-dimensional text input in an augmented reality system, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   displaying a three-dimensional virtual space with a displayed first axis, a displayed second axis, and a displayed third axis on a display screen of the augmented reality system, wherein each character of a language is displayed and evenly distributed along each of the displayed first axis and the displayed second axis;
   capturing a first user hand position along the first axis of the three-dimensional virtual space;
   identifying a first character along the first axis corresponding to the first user hand position;
   capturing a second user hand position along the second axis of the three-dimensional virtual space;
   identifying a second character along the second axis corresponding to the second user hand position;
   identifying one or more proposed words beginning, consecutively, with the identified first character and the identified second character using a dictionary database; and
   displaying the one or more identified proposed words on the third axis of the three-dimensional virtual space.

8. The computer system of claim 7, further comprising:
   capturing a third user hand position along a fourth axis of the three-dimensional virtual space;
   identifying a third character along the fourth axis corresponding to the third user hand position; and
   wherein identifying the one or more proposed words comprises using the identified first character, the identified second character, and the identified third character, consecutively, utilizing the dictionary database.

9. The computer system of claim 7, wherein further comprising:
   receiving a user selection of a word within the one or more identified proposed words displayed on the third axis; and
   transmitting the word associated with the received user selection an application as a text file.

10. The computer system of claim 7, wherein the three-dimensional virtual space initially comprises a graph of two axes on which the user interacts to capture each user hand position, and wherein a new axis is added to the added to the graph after each user hand position is captured.

11. The computer system of claim 7, further comprising:
   capturing a third user hand position along the first axis of the three-dimensional virtual space;
   identifying a third character along the first axis corresponding to the third user hand position;
   capturing a fourth user hand position along the second axis of the three-dimensional virtual space;
   identifying a fourth character along the second axis corresponding to the fourth user hand position; and wherein identifying the one or more proposed words comprises using the identified first character, the identified second character, the identified third character, and the fourth identified character, consecutively, utilizing the dictionary database.

12. The computer system of claim 7, further comprising:
sorting the one or more identified proposed words based on a commonality of each identified proposed word in a corresponding language.

13. A computer program product for implementing three-dimensional text input in an augmented reality system, the computer program product comprising:
one or more computer-readable tangible storage media and program instructions stored on at least one of the one or more tangible storage media, the program instructions executable by a processor of a computer to perform a method, the method comprising:
displaying a three-dimensional virtual space with a displayed first axis, a displayed second axis, and a displayed third axis on a display screen of the augmented reality system, wherein each character of a language is displayed and evenly distributed along each of the displayed first axis and the displayed second axis;
capturing a first user hand position along the first axis of the three-dimensional virtual space;
identifying a first character along the first axis corresponding to the first user hand position;
capturing a second user hand position along the second axis of the three-dimensional virtual space;
identifying a second character along the second axis corresponding to the second user hand position;
identifying one or more proposed words beginning, consecutively, with the identified first character and the identified second character using a dictionary database; and
displaying the one or more identified proposed words on the third axis of the three-dimensional virtual space.

14. The computer program product of claim 13, further comprising:
capturing a third user hand position along a fourth axis of the three-dimensional virtual space;
identifying a third character along the fourth axis corresponding to the third user hand position; and
wherein identifying the one or more proposed words comprises using the identified first character, the identified second character, and the identified third character, consecutively, utilizing the dictionary database.

15. The computer program product of claim 13, wherein further comprising:
receiving a user selection of a word within the one or more identified proposed words displayed on the third axis; and
transmitting the word associated with the received user selection an application as a text file.

16. The computer program product of claim 13, wherein the three-dimensional virtual space initially comprises a graph of two axes on which the user interacts to capture each user hand position, and wherein a new axis is added to the added to the graph after each user hand position is captured.

17. The computer program product of claim 13, further comprising:
capturing a third user hand position along the first axis of the three-dimensional virtual space;
identifying a third character along the first axis corresponding to the third user hand position;
capturing a fourth user hand position along the second axis of the three-dimensional virtual space;
identifying a fourth character along the second axis corresponding to the fourth user hand position; and
wherein identifying the one or more proposed words comprises using the identified first character, the identified second character, the identified third character, and the fourth identified character, consecutively, utilizing the dictionary database.

\* \* \* \* \*